HARTLEY & MOREHOUSE.
Coffee Pot.
No. 35,021. Patented April 22, 1862.
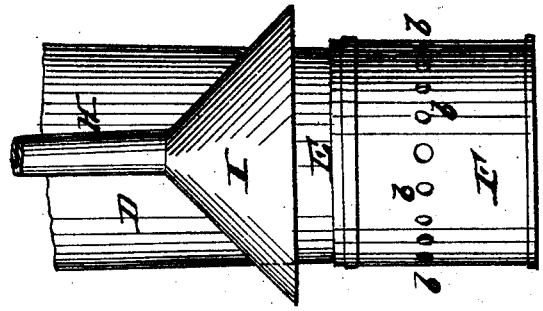
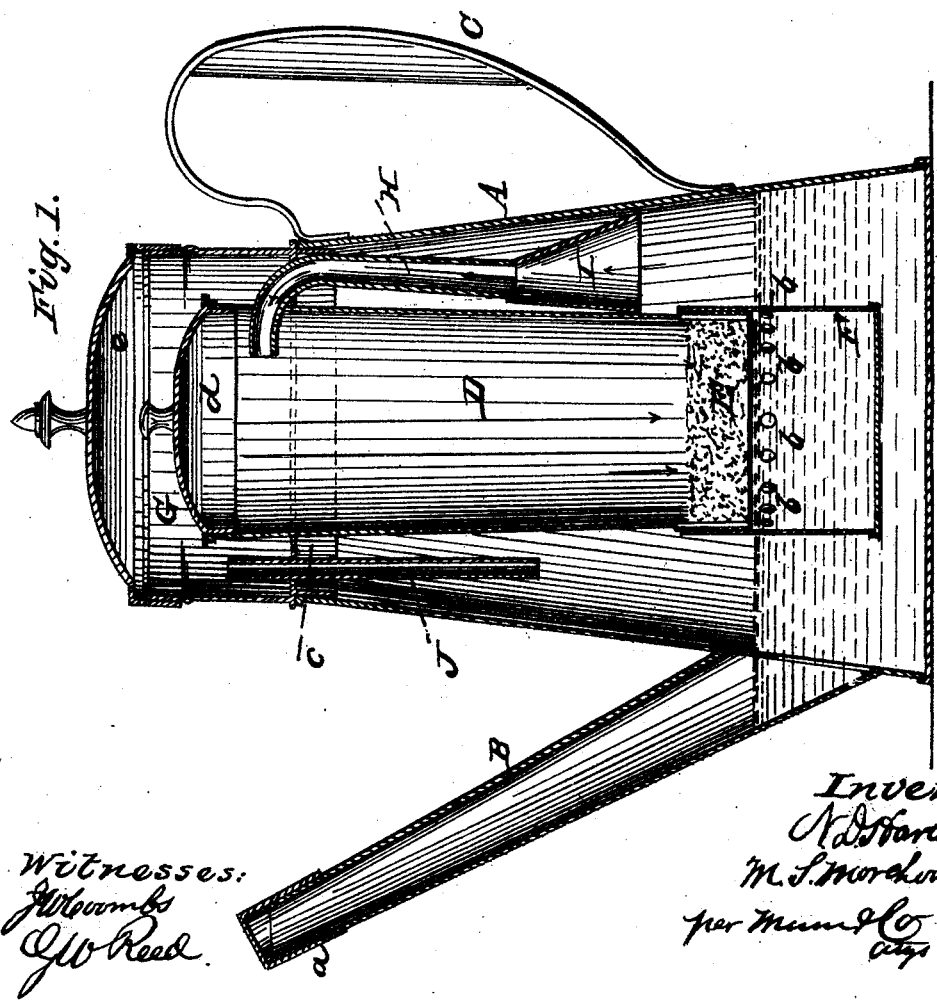

UNITED STATES PATENT OFFICE.

NORTON D. HARTLEY AND MARCUS S. MOREHOUSE, OF QUINCY, ILLINOIS.

IMPROVEMENT IN COFFEE-POTS.

Specification forming part of Letters Patent No. 35,021, dated April 22, 1862.

*To all whom it may concern:*

Be it known that we, NORTON D. HARTLEY and MARCUS S. MOREHOUSE, both of Quincy, in the county of Adams and State of Illinois, have invented a new and Improved Coffee-Pot; and we do hereby declare that the following is a full, clear, and exact description of the same, reference being had to the annexed drawings, making a part of this specification, in which—

Figure 1 is a vertical central section of our invention. Fig. 2 is a detached side view of a portion of the same.

Similar letters of reference indicate corresponding parts in the two figures.

To enable those skilled in the art to make and use our invention, we will proceed to describe it.

A represents the body of the coffee-pot, which may be constructed in the usual or any proper way, and provided with a nozzle, B, having a cap, $a$, on its upper end. The body A is also provided with a handle, C.

D is a cylindrical vessel, which is considerably smaller in diameter than the body A of the pot, and has a strainer, E, fitted on its lower end, and also a box, F, the latter being perforated, as shown at $b$, the perforations being just below the strainer E, as shown clearly in Fig. 1.

The vessel D has a cylindrical box, G, attached to its upper end, which is larger in diameter than the vessel D. The box G has a flange, $c$, at its lower end, and this flange fits snugly into the top of the body A of the pot, while the vessel D extends some distance up within the box G, the former being provided with a lid, $d$, as shown in Fig. 1. The box G is also provided with a lid, $e$.

H is a tube, the upper end of which is curved or bent and extends into the upper part of the vessel D, while the lower part extends down within the body A of the pot and is provided with a flaring end, I. (Shown more particularly in Fig. 2.) A pipe, J, passes through the bottom of box G at the outer side of vessel D and forms a communication between the box G and the interior of the body A of the pot.

The operation is as follows: The ground coffee is placed in the vessel D and the water is poured into the body A of the pot, the cap $a$ being fitted on spout B, and the lid $d$ fitted on the vessel D, and the lid $e$ on box G. The water in A, while boiling, extracts the strength from the coffee at the lower end of the vessel D, and consequently the coffee is immersed in the water in A. The steam is not allowed to escape from the body A, but passes up through pipe H into the vessel D, where it condenses. The pipe J admits steam into the box G, and prevents the lid $d$ being removed by the pressure of steam in the vessel D. Said pipe J also serves as an escape or safety pipe in case of the too rapid and forcible generation of steam, for when the pressure of steam is too great the top $e$ will be lifted from the chamber G. By this arrangement the aroma of the coffee is not allowed to escape from the pot, and all sediment which may pass through the strainer E will settle in the box F, the holes $b$ being a considerable distance above the bottom of box F.

Having thus described our invention, we claim as an improved article of manufacture—

A coffee-pot provided with pipes J H, chamber G, vessel D, strainer E, and box F, and otherwise made as herein shown and described.

N. D. HARTLEY.
MARCUS S. MOREHOUSE.

Witnesses:
EVAN MARSHALL,
ALLEN COMPTON.